April 8, 1947. E. A. SCHACHINGER Re. 22,864

WATCHMAN'S SIGNAL SYSTEM

Original Filed Oct. 21, 1941 3 Sheets-Sheet 1

INVENTOR.
Edward A. Schachinger
BY
Hoguet, Mealy & Campbell
ATTORNEYS

April 8, 1947. E. A. SCHACHINGER Re. 22,864

WATCHMAN'S SIGNAL SYSTEM

Original Filed Oct. 21, 1941 3 Sheets-Sheet 2

INVENTOR.

Edward A. Schachinger

BY

Arquet, Mecy & Campbell

ATTORNEYS

April 8, 1947. E. A. SCHACHINGER Re. 22,864
WATCHMAN'S SIGNAL SYSTEM
Original Filed Oct. 21, 1941 3 Sheets-Sheet 3
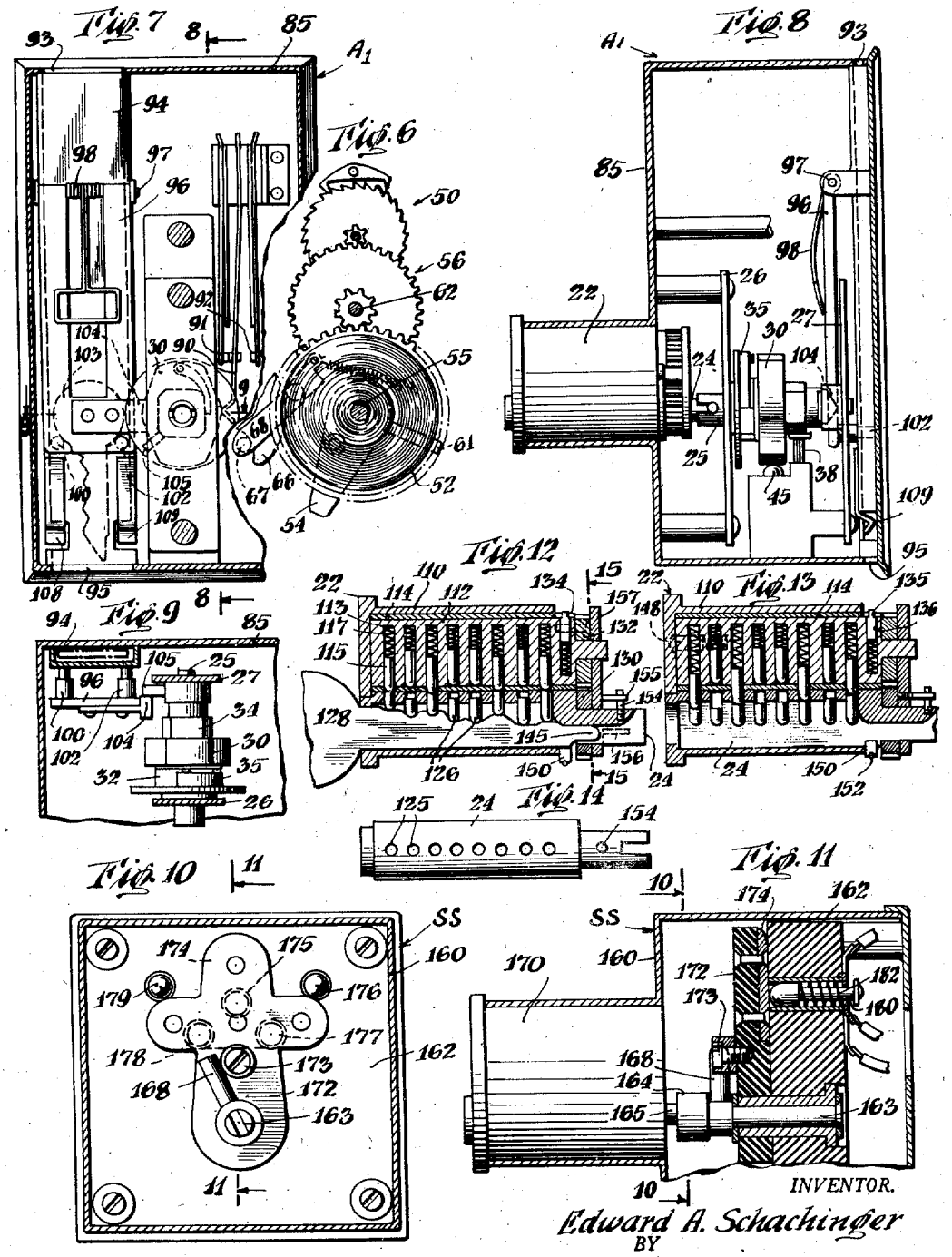
INVENTOR.
Edward A. Schachinger
BY
Mozquet, Meary & Campbell
ATTORNEYS Reissued Apr. 8, 1947 Re. 22,864

UNITED STATES PATENT OFFICE 22,864

WATCHMAN'S SIGNAL SYSTEM

Edward A. Schachinger, New York, N. Y.

Original No. 2,376,389, dated May 22, 1945, Serial No. 415,863, October 21, 1941. Application for reissue May 18, 1946, Serial No. 670,697

23 Claims. (Cl. 177—360)

This invention relates to a watchman's signal system and one of the objects of the invention is to provide a watchman's signalling system which not only requires actuation of a series of preliminary stations for each routine trip but also includes a novel arrangement designed to cause an alarm signal to be transmitted to a central or supervising station in the event an unauthorized person should attempt to operate the signalling system by making the rounds instead of the authorized watchman.

The invention has for a further object to provide a watchman's signalling system that is more positive as compared with prior systems in its assurance that the watchman shall be obliged to follow a predetermined tour of preliminary stations and which makes it practically impossible for the watchman or another to provide a duplicate key or keys which can be used to effect unauthorized actuations of the locks at any of such preliminary stations.

Other objects of the invention are indicated in the following outline of the features of the invention:

One of the features of the invention is the provision of at least one dummy preliminary station, the selection and location of which may only be known by two people and which should it be actuated during a routine trip will cause an alarm signal to be sounded.

Another feature of the invention is the provision of a watchman's signalling system having a transmitter station and one or more preliminary stations so constructed, interconnected and situated as to require the watchman to make periodic routine trips and therefore periodic surveys of the property and if the watchman fails to do so or tries to cut short the trip or if any unauthorized person meddles with the stations, such will result in an alarm which will call for an emergency check-up by those in charge.

Another feature of the invention is the provision of a watchman's signalling system having a transmitter station and a plurality of preliminary stations together with means under the control of an authorized person to connect one of the preliminary stations as a dummy station which should it be actuated will condition the system so that an alarm signal will be transmitted upon the subsequent operation of the transmitter.

Another feature of the invention is to provide an automatic key combination changing lock for a series of watchman's routine stations and for other usage, the lock operating when actuated by the proper key to automatically change the tumbler combination of the lock so that for a subsequent operation a different predetermined key will be required.

Still another feature of the invention is the provision of a combination lock for a series of watchman's routine stations and for other usage, the changeable combinations of the tumblers thereof being controlled by a combination changing key so that should the key for a particular tumbler combination become lost or stolen, the tumbler combination can be readily changed for a different key.

A further feature of the invention is to provide a type of lock station for a watchman's signalling system having a key compartment from which a key is adapted to be released when the lock is actuated.

A still further feature of the invention is to provide a transmitter station for a watchman's signalling system of the type which is adapted to be actuated by a key to effect transmission of a signal but which is provided with means to prevent repeated actuation of the lock thereof until the transmitter has had sufficient time to transmit the signal.

The above and additional objects and features of the invention are obtained by providing a transmitter station and a plurality of preliminary stations each of which has a lock, a switch and means operable upon actuation of the lock to change the switch from one to another position. The several stations are electrically interconnected so as to require the watchman to actuate the locks of the stations according to a predetermined plan before he can transmit a routine signal by actuation of the transmitter station, and that should the preliminary stations not be actuated according to the plan an alarm signal will result instead.

Two of the preliminary stations are provided with dummy locks, that is to say, the locks are actuatable by any of the keys or by a master key which may be used with the system. Means are provided to selectively connect one of the two preliminary stations as a dummy preliminary station which is not intended according to the plan of operation to be actuated during the watchman's routine trip.

Each of the preliminary stations is provided with a key compartment adapted to receive the key which has been used to actuate the lock of that particular station, together with means to release another key from the compartment for use on the lock of the next succeeding station in the series. The two stations selectable as the dummy station are provided with master keys in their key compartments which are usable on any of the other preliminary stations in the system. The primary purpose of the dummy stations is to catch any intruder who might meddle with the system. It is even effective in foiling unauthorized operation of the system by those who are acquainted with the system since the selection can be changed should the watchman or any other employee familiar with the system leave employment. This is accomplished by providing a lock controlled switch by which one or the other of the two stations is selected as either a regular preliminary station or as a dummy preliminary station. The two stations are actuatable by any key in the series so that should a person obtain a key of the system he may, in an effort to locate the corresponding station, actuate the selected dummy station which when actuated will condition the system so that upon subsequent actuation of the transmitter an alarm signal will result. Also, actuation of the dummy station will release a master key so that the intruder will not be suspicious that anything other than routine has happened.

Any alarm signal or a failure of a routine signal to come in at the time intervals planned will in effect result in an alarm at the central station so that a prompt check-up may be made to determine the trouble.

In one embodiment of the invention each of the stations with the exception of the two selective stations and the transmitter station is provided with an automatic combination changing lock which is so constructed that when the lock is actuated, a change in the tumbler combination of the lock is caused so that the lock can only be actuatable thereafter by a different predetermined key. This type of lock requires the watchman to survey the property along a predetermined route because he is required to actuate the locks in a predetermined sequence.

In another embodiment of the invention the stations are each provided with a lock of the multiple-combination type wherein the tumbler combination can only be changed by a combination changing key. With the stations provided with this type of lock, only one key is used by the watchman. When it is desirable to change the locks for use with a different key, the superintendent or other authorized person actuates each lock by the combination changing key and issues a new key. The locks thereafter will then be actuatable only by the new key and, of course, by the combination changing key.

The transmitter station is provided with a winding device which is adapted to be wound upon actuation of the lock and when released upon the return movement of the key it will operate to transmit a code signal. The mechanism for actuation of the winding device is provided with means whereby the lock cannot be repeatedly actuated except after a complete signal has been transmitted after each lock actuation. The transmitter station is so connected electrically with the preliminary stations that a routine signal can only be transmitted after proper actuation of a predetermined series of preliminary stations.

For a better understanding of the invention, reference is had to the following detailed description to be read in connection with the accompanying drawings, in which:

Fig. 6 is a fragmentary vertical sectional view taken substantially along line 6—6 of Fig. 5;

Fig. 7 is a fragmentary vertical sectional view of a preliminary station;

Fig. 8 is a view in vertical elevation taken substantially along line 8—8 of Fig. 7;

Fig. 9 is a fragmentary horizontal sectional view taken substantially along line 9—9 of Fig. 7;

Fig. 10 is a vertical sectional view of a dummy station selection switch taken substantially along line 10—10 of Fig. 11;

Fig. 11 is a vertical sectional view taken substantially along line 11—11 of Fig. 10;

Fig. 12 is a vertical sectional view of an automatic key combination changing lock, which may be used with certain of the preliminary stations, shown with a key inserted therein;

Fig. 13 is a vertical sectional view of the lock shown in Fig. 12 with the key removed;

Fig. 14 is a plan view of the key-way shaft of the lock shown in Figs. 12 and 13;

Figure 1:
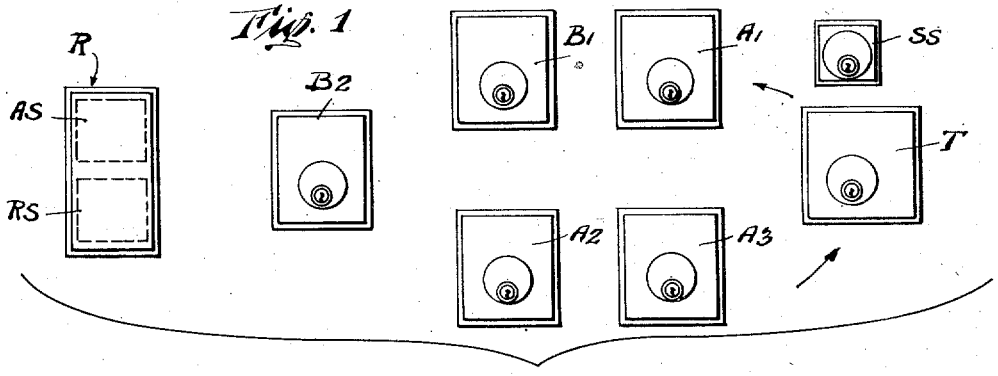
Fig. 1 is a diagrammatic illustration of a watchman's signalling system arranged in accordance to the present invention.
Figure 2:
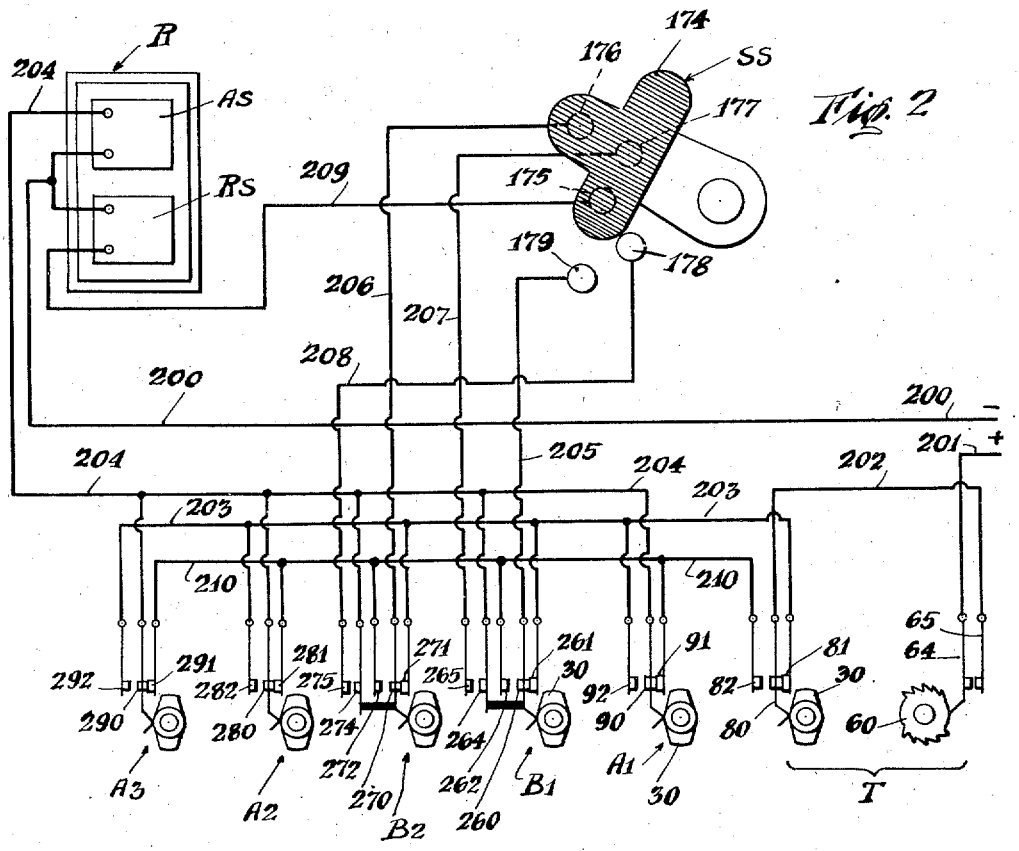
Fig. 2 is a diagrammatic illustration of the switches of a group of stations, a dummy station selection switch and circuit connections therefor in accordance to the present invention.

Referring to Figs. 1 and 2 of the drawings, I have shown a series of stations adapted to be located at various places on the property so that a watchman will be required to make periodically a complete survey of the property in order to actuate each or at least a predetermined series of the stations before he can transmit his periodic routine signals. The system of stations is very elastic and may comprise besides one transmitter station, one or any desired number of preliminary stations. As shown in Figs. 1 and 2 a set of six stations has been chosen for purposes of illustration. The set comprises one transmitter station T and five preliminary stations $A_1$, $B_1$, $B_2$, $A_2$ and $A_3$, and a selector switch SS by which one of the preliminary stations $B_1$ and $B_2$ can be selectively selected as a dummy station which is to be avoided by the watchman during his routine trips.

More particularly, the preliminary station $B_1$ or $B_2$, whichever is selected by the position of the switch SS, has the same appearance as the other preliminary stations and is connected into the system so that should it be unwittingly actuated by an intruder or other person bent on performing mischief its actuation will condition the system so that when the transmitter station T is actuated an alarm signal will be effected instead of the usual routine signal. Thus during a watchman's trip to survey the property he will, on leaving the transmitter station T, actuate first the preliminary station $A_1$, then avoid the station $B_1$ or $B_2$, whichever has been selected by the setting of the switch SS, and actuate the one not selected, then actuate stations $A_2$ and $A_3$ and finally the transmitter station T.

A signal receiver R is placed in a central location or at an office and may be provided with any suitable sounding and/or recording instruments. In the form diagrammatically illustrated in Figs. 1 and 2, the receiver R is provided with a routine signal sounding device RS and an alarm sounding device AS. The devices RS and AS give different audible signals so that an attendant can readily distinguish alarm signals from periodic routine signals. The system, as will be hereinafter more particularly brought out, can have besides a routine signal three types of alarm warnings. These are, depending on the operation of the system, an audible alarm signal, a double signal as when both routine and alarm signals are sounded simultaneously and the omission of the periodic routine signal which in effect is a warning that something has happened to the watchman.

Figure 3:
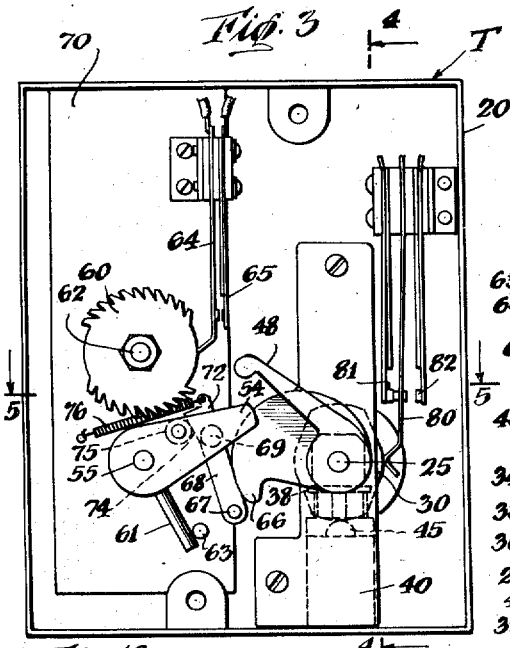
Fig. 3 is a view in vertical elevation of a transmitter station as seen from the left-hand side of Fig. 4.
Figure 4:
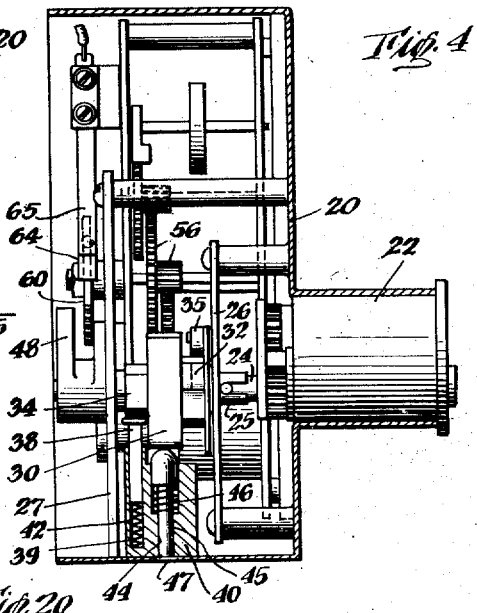
Fig. 4 is a vertical sectional view taken substantially along line 4—4 of Fig. 3.
Figure 5:
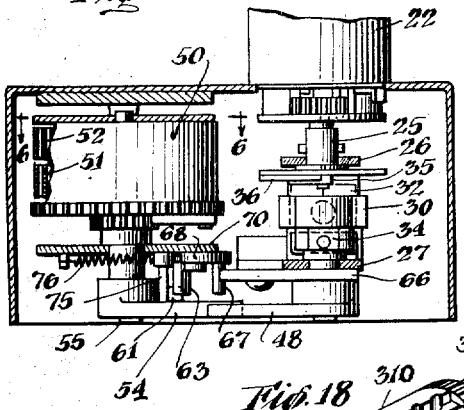
Fig. 5 is a horizontal sectional view taken substantially along line 5—5 of Fig. 3.
Figure 15:
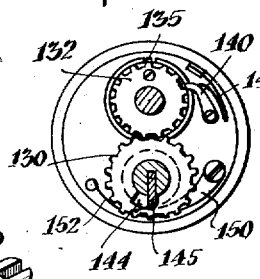
Fig. 15 is a vertical sectional view taken substantially along line 15—15 of Fig. 12.

Referring more particularly to Figs. 3, 4 and 5 of the drawings, the transmitter station T comprises a housing 20 having mounted therein a suitable lock 22, the key-way shaft 24 of which is adapted to be coupled with a shaft 25 mounted in frame members 26 and 27. Rotatably mounted on the shaft 25 is a high and low lobe cam 30 to which is secured on one side thereof a four-toothed ratchet 32 and on the other side thereof a stabilizing hub portion 34. Carried by the shaft 25 is a pawl 35 which is biased by a spring 36 against the ratchet 32. The pawl 35 is adapted to engage the teeth on the ratchet and move the ratchet and the cam 30 through an angle of 90° each time the shaft 25 is actuated by the key-way shaft 24. The cam 30 is adapted to engage a movable contact 80 for successive engagement with contacts 81 and 82 as the low and high portions of the cam are moved beneath the contact 80.

The stabilizing element 34 is provided with four flat faces engageable by a flat faced detent 38 contained in a bore 39 in a block 40 which is mounted on a wall of the housing 20. The detent 38 is biased against the element 34 by a spring 42 to insure proper positioning of the cam 30 for each actuation of the lock. The block 40 also contains a bore 44 within which a cam position indicator 45 is adapted to move. The indicator is biased upwardly by a spring 46 against the cam 30 and its positions are detectable through an opening 47.

Each station is provided with an indicator 45 so that the superintendent or other authorized person can determine by inspection the setting of each station should routine operation be interrupted. Thus the system can easily be reconditioned for resumption of routine operation without dismantling any of the stations.

Carried on the shaft 25 is also a winding arm 48 by which the spring drive of an escapement mechanism 50 can be wound to effect transmission of signals. The mechanism 50 is provided on a shaft 55 with a pair of springs 51 and 52 (Fig. 5) which are relatively weak so that their resistance to winding is not too great for an average size key and yet strong enough that when wound they will provide adequate power to operate the escapement mechanism and the associated code transmitter. The arm 48 is adapted to engage an arm 54 carried by the shaft 55 to wind the springs 51 and 52. The normal position of the arm 54 is determined by an arm 61 adapted to engage a stop 63. The escapement mechanism is provided with suitable reduction gearing 56 (Fig. 6) and a code transmitter 60 is carried by a shaft 62 thereof.

The code transmitter 60 is shown as comprising a disk having two sets of eleven teeth each, which when the disk is revolved 360° actuate a switch contact 64 relative to a contact 65 to send two groups of successive impulses over the circuit of the system. The number of impulses transmitted indicate the watchman's number or the identity of the transmitter station from which the signal is transmitted, it being understood that the signals can have any number of impulses per group and any number of groups; also that the system can have more than one transmitter station and that each such station can have a different signal.

To prevent anyone from actuating the transmitter T again before it has been given sufficient time to transmit a signal, a safety hook 66 is provided to engage a lug 67 on an arm 68 pivoted at 69 on the frame 70. The arm 68 is provided with a cam surface 74 biased by a spring 76 toward a lug 75 on the arm 54. As the arm 54 becomes unwound the lug 75 pivots the arm 68 to a position removing the lug 67 thereon out of the path of the hook 66. Thus, whenever the transmitter has completed transmission of a signal, the lug 67 reaches a position where it permits actuation of the lock 22 and the arm 48 connected thereto.

When, for example, the lock 22 is actuated by a key the shaft 25 is revolved counterclockwise as viewed in Fig. 3, causing the arm 48 to engage and force the arm 54 clockwise to wind the springs 51 and 52. During the clockwise rotation of the arm 54 the lug 75 moves along the cam surface 74 to permit the spring 76 to urge the lug 67 against the outer surface of the safety hook 66. When the key-way shaft 24 and the shaft 25 are retracted by reverse movement of the key, the hook 66 is revolved clockwise and the spring 76 snaps the lug 67 in front of the hook 66. (See Fig. 6.)

As the escapement mechanism drives the transmitter 60, the arm 54 revolves counterclockwise and the lug 75 thereon engages the cam surface 74 to gradually pivot the arm 68 clockwise and thereby move the lug 67 out of the path of the hook 66 so that by the time the arm 61 engages the stop 63 the lug 67 will have cleared the hook 66.

The preliminary stations $A_1$, $B_1$, $B_2$, $A_2$ and $A_3$ are identical in construction and equipment, except that the stations $B_1$ and $B_2$ are each provided with a switch having five contacts instead of three and a dummy lock, the purpose of which will be hereinafter described.

In Figs. 7, 8 and 9, the preliminary station $A_1$ is shown as representative of the preliminary stations and since many parts thereof are identical to parts used in the transmitter station, such identical parts are identified by the same reference characters. As in the transmitter station T, the housing 85 of the station $A_1$ is provided with a lock 22, the key-way shaft 24 of which is coupled to the shaft 25 suitably supported in frame elements 26 and 27, and the shaft 25 is provided with a switch contact cam 30, a ratchet 32, pawl 35 and a stabilizer hub 34. Associated with the switch contact cam 30 is a cam position indicator 45 and a movable contact 90 which is adapted to engage contacts 91 and 92, depending on whether the low or high portion of the cam is in engagement with the contact 90.

The preliminary stations are each provided with a key compartment 94 defining a narrow passageway extending from a narrow key inlet slot 93 in the upper wall of the housing 65 downwardly to a corresponding discharge slot 95 at the bottom thereof. Pivotally mounted at 97 adjacent the key compartment is a movable frame 96 biased by a spring 98 so that a pair of lugs 100 and 102 thereon are normally held in a position in which they extend transversely of the compartment. When a key is dropped into the compartment, the head portion 103 of the key is engaged by the lugs 100 and 102 to support the key within the compartment (Figs. 7 and 8). The frame 96 is provided with a cam surface 104 which is engageable by an arm 105 carried by the shaft 25. During actuation of the lock 22 the arm 105 is rotated and removes the lugs 100 and 102 from key supporting position to a key releasing position indicated in Fig. 9. This permits the key to drop downwardly in the key compartment and engage a pair of spring elements 108 and 109 which releasably retain the key within easy access of the watchman.

Figure 16:
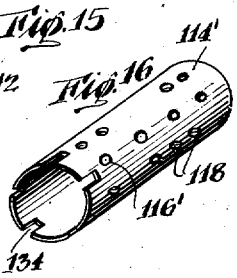
Fig. 16 is a perspective view of a combination changing sleeve of the lock shown in Figs. 12 to 15.

Referring to Figs. 12 to 16 of the drawings, an automatic combination lock 22 is disclosed which may be used in the transmitter station T and the preliminary stations $A_1$, $A_2$ and $A_3$ so as to require the watchman to make his routine trips to the several stations in a predetermined sequence. The automatic lock comprises a barrel 110 within which is mounted the key-way shaft 24 and a pin tumbler magazine 112. The magazine has a row of sockets 113 each containing a pin 115 and a spring 117. Surrounding the magazine 112 is a combination changing sleeve 114 which is provided with a plurality of longitudinal rows 116 of apertures 118 (Fig. 16). Each aperture 118 is circumferentially in line with a pin tumbler 115. The lock as illustrated has eight pin tumblers. There are, therefore, eight circumferential lines upon which apertures 118 may fall. In other words, there are eight aperture positions along each longitudinal line of the sleeve 114, any combination of which may be employed to form a single row 116. The number of rows 116 is limited only by the circumference of the sleeve 114 and the size of the apertures 118.

For the set of six stations illustrated in Figs. 1 and 2, the lock may be provided with five rows 116 or in other words with five different key combinations. Sleeves with a lesser or greater number of rows 116 can be provided and for systems having eleven stations, for example, the sleeve will be provided with ten rows 116. For still larger systems, duplication of sets, either of six or eleven stations or both can be provided, the sixth or eleventh station, as the case may be, being a transmitter station from which signals are transmitted.

It is of course obvious that any desired number of pin tumblers may be employed, a set of eight pin tumblers being shown and described for purpose of illustration. The key-way shaft 24 is provided with a row of eight sockets 125 in which are disposed a like number of tumbler pins 126.

Assuming that the sleeve 114 is in such a position that the first, third, sixth and eighth pins are permitted to pass therethrough, as indicated in Figs. 12 and 13, a suitable key 128 will lift the first, third, sixth and eighth pins 126 an amount necessary to move the corresponding pins 115 until the lower ends thereof no longer extend beyond the sleeve. In this position the key is permitted to turn and actuate the shaft.

Upon actuation of the key, the sleeve 114 is moved one position so as to bring the next adjacent row of apertures into alignment with the tumbler pins 115. This is accomplished by a pair of gears 130 and 132, the gear 130 being rotatably carried on the key-way shaft 24 and the gear 132 being fixed to the magazine 112. The sleeve 114 is provided at one end thereof with a circumferential row of notches 134 (Fig. 16). The magazine 112 is provided with a cam shaped detent 135 contained in a socket 136 which is adapted to engage the notched portion of the sleeve 114 for movement with the magazine in one direction and to slip under the notched portion when the movement of the magazine is reversed. Mounted on the end of the barrel 110 is a pawl 140 (Fig. 15) which is biased by a spring 142 so as to engage the notched portion of the sleeve 114. The gear 130 has an opening 144 to receive the inner end 145 of the key 128. When the key-way shaft 24 is actuated, the gear 130 is engaged by the inner end portion 145 of the key 128 during the 90° turn of the key-way shaft causing the gear 130 which revolves clockwise (Fig. 15) to drive the gear 132 counterclockwise past the pawl 140. The movement of the gears 130 and 132 causes the sleeve 114 due to the detent 135 to be revolved with the magazine. During the reverse movement of the key-way shaft the pawl 140 is adapted to engage one of the notches 134 and hold the sleeve 114 in an advanced position while the detent 135 is adapted to pass beneath the notched portion of the sleeve. To accurately center the row of recesses 113 of the magazine 112 with the selected row of apertures of the sleeve 114, a spring biased detent 148 is provided in the magazine as indicated in broken lines in Fig. 13. Thus when a key has been used to actuate the lock and has been withdrawn therefrom, the sleeve 114 will have been moved from one combination position to another. The same key therefore cannot be used to repeat the actuation until the lock has been successively actuated by all the other keys corresponding to the series of combinations.

In order to minimize the chance of anyone picking the lock, the barrel 110 is provided with a pawl 150 (Figs. 12, 13 and 15) which is biased by a spring 152 to a position extending into the key-way shaft. When a key is inserted, the inner end of the key is adapted to dislodge the pawl 150 (Fig. 12) so that it will not interfere with the operation of the lock. Thus, anyone attempting to pick the lock must not only force the tumbler pins upwardly on one side of the shaft but must also force the pawl 150 outwardly on the other side.

The key-way shaft 24 is provided at one end thereof with a pin 154 which is engageable with stop pins 155 and 156 mounted on an end plate 157 of the lock to limit the movement of the shaft.

The preliminary stations $B_1$ and $B_2$ are provided with locks similar to the form illustrated in Figs. 12 to 16 with the exception that the tumblers are omitted so that any key for the series of combinations will actuate them. In such dummy locks the gears 130 and 132 as well as the magazine 112 may be omitted for reasons of economy.

The transmitter station T, while shown as provided with an automatic lock 22 may for simplicity be provided instead with a dummy lock the same as stations $B_1$ and $B_2$. With a dummy lock, the transmitter station may then be actuated by any key used in the system. Where the station T is provided with an automatic lock, the setting of the sleeve 114 thereof is the same as the next successive station $A_1$. The watchman, of course, will in this case have a master key to actuate station T when he wishes to transmit an alarm signal.

The preliminary stations $B_1$ and $B_2$ are adapted to be selectively so connected as to transform the station so selected into a dummy station which is to be avoided by the watchman during his routine trips. This selection is accomplished by operation of a selective switch SS shown in Figs. 2, 10 and 11. The switch SS comprises a housing 160 containing a block of insulation 162 through which a shaft 163 extends and is coupled at 164 to the key-way shaft 165 of a suitable lock 170. Pivotally mounted on the shaft 163 is an insulated arm 172 having a conductor segment 174. The block 162 is provided with a plurality of engageable contacts 175, 176, 177, 178 and 179, each constituting a movable pin 180 biased by a spring 182 to a position engageable by the segment 174. The segment is of such a size and shape as to electrically connect when in one position contacts 175, 176 and 177 (Fig. 2) and in another position contacts 175, 178 and 179.

Movement of the segment 174 from one position to another is accomplished by an arm 168 carried on the shaft 163, the arm being adapted to engage, during operation of the lock, a bolt 173 carried on the arm 172. The lock 170 may be of any desired type and for purposes of illustration may be of the type shown in Figs. 17 and 18 to be hereinafter described.

The switch SS and the several switches of the stations are interconnected by a circuit illustrated in Fig. 2. A suitable source of electricity either from batteries or from any other available source is provided for the system through wires 200 and 201. The wire 201 is connected to the movable contact 64 operated by the signal transmitter 60. The contact 65 engageable by contact 64 is connected by a wire 202 to the movable contact 80 of the transmitter station the relative position of which with respect to contacts 81 and 82 is controlled by the cam 30.

Each of the preliminary stations is provided with three contacts similar to the contacts 80, 81 and 82 of the transmitter station T. These contacts are: For station $A_1$, 90, 91 and 92; for station $B_1$, 260, 261 and 262; for station $B_2$, 270, 271 and 272; for station $A_2$, 280, 281 and 282; and for station $A_3$, 290, 291 and 292.

Wire 203 connects contact 81 to contacts 92, 261, 271, 282 and 292. Wire 210 connects contact 82 to the contacts 91, 262, 272, 281 and 291. Wire 204 connects the movable contacts 90, 280 and 290 of stations $A_1$, $A_2$ and $A_3$, and also the movable contacts 264 and 274 of the stations $B_1$ and $B_2$ to the alarm signalling device AS. Movable contact 260 of station $B_1$ is connected by a wire 205 to the contact 179 of the switch SS. Likewise the movable contact 270 of station $B_2$ is connected by wire 206 to the contact 176 and contacts 265 and 275 of the stations $B_1$ and $B_2$ are connected by wires 207 and 208 to contacts 177 and 178 respectively. The contact 175 of the selective switch SS which is always engaged by the segment 174 is connected by wire 209 to the routine signalling device RS. The wire 200 from the source of electricity is connected to both signalling devices RS and AS so that whenever the circuit is completed for either one or both of the devices, either a routine or an alarm signal or a double (routine and alarm) signal will be sounded.

The circuit connections are such that when all of the preliminary stations have been actuated according to a predetermined plan, that is, with all of the switch actuating cams moved to either vertical or horizontal positions, the selected dummy station $B_1$ or $B_2$, as the case may be, being disregarded, a routine signal will be transmitted to the receiver station R upon operation of the transmitter 60. This circuit condition can be readily traced in Fig. 2 wherein the cams are all shown in vertical position. As the transmitter 60 revolves through 360° to actuate the switch contacts 64 and 65, electrical impulses will be conducted over a circuit including the wire 201, contacts 64, 65, wire 202, contacts 80, 81, wire 203, contacts 270, 271, wire 206, contact 176, segment 174, contact 175 and wire 209 to the routine signalling device RS. The contacts 179, 92, 282 and 292 being disengaged for the condition illustrated in Fig. 2, no other circuit is completed. If any one or all of the stations $A_1$, $B_2$, $A_2$ and $A_3$ were not actuated to the positions indicated in Fig. 2, an alarm signal would be effected upon operation of the transmitter, since each such station, if not actuated according to plan will provide a circuit connection to wire 204 and thence to the alarm signalling device AS. This will become more apparent on consideration of the table hereinbelow and the tracing of circuits for different conditions.

The circuits completed by various combinations of switch positions may easily be traced in Fig. 2 to determine whether a routine signal, an alarm signal, a double signal (routine and alarm) or no signal at all (silence) is transmitted upon operation of the transmitter 60. The following table gives the signal results for various combinations with the stations $B_1$ selected by the selector switch SS (Fig. 2) as the dummy station.

Table

*Cam positions of stations*

| Dummy station | One of the stations | All other stations | Signal |
|---|---|---|---|
| 1. $B_1$ vertical | | Vertical (Fig. 2) | Routine. |
| 2. $B_1$ vertical | | Horizontal | Do. |
| 3. $B_1$ vertical | T horizontal | Vertical | Alarm. |
| 4. $B_1$ vertical | T vertical | Horizontal | Do. |
| 5. $B_1$ vertical | $A_1$ horizontal | Vertical | Double. |
| 6. $B_1$ vertical | $A_1$ vertical | Horizontal | Do. |
| 7. $B_1$ vertical | $B_2$ horizontal | Vertical | Silence. |
| 8. $B_1$ vertical | $B_2$ vertical | Horizontal | Do. |
| 9. $B_1$ vertical | $A_2$ horizontal | Vertical | Double. |
| 10. $B_1$ vertical | $A_2$ vertical | Horizontal | Do. |
| 11. $B_1$ vertical | $A_3$ horizontal | Vertical | Do. |
| 12. $B_1$ vertical | $A_3$ vertical | Horizontal | Do. |
| 13. $B_1$ horizontal | | Vertical | Do. |
| 14. $B_1$ horizontal | | Horizontal | Do. |

The circuit for the cam positions of condition No. 1 of the table has been heretofore traced. The circuit for the cam positions of condition No. 2 includes wire 202, contacts 80, 82, wire 210, contacts 272, 270, wire 206, contact 176, segment 174, contact 175 and wire 209 to the routine signalling device RS.

Conditions 3 and 4 each effect an alarm upon operation of the transmitter. This is easily seen in Fig. 2 since three circuits for each such condition are provided through the contacts of stations $A_1$, $A_2$ and $A_3$ to the wire 204 leading to the alarm signalling device AS.

Taking the cam positions of condition No. 5 of the table, that is, with the cam of station $A_1$ horizontal and all others in the vertical, the circuit includes wire 202, contacts 80, 81, wire 203, contacts 92, 90 and wire 204 to the alarm signalling device AS. A parallel circuit to the one just described also exists for condition No. 5. Leading from wire 203 the second circuit passes through contacts 271, 270 and on through the wire 206, switch SS and the wire 209 to the routine signalling device RS. Thus a double signal, both routine and alarm, is sounded. Such a double signal naturally is interpreted as an alarm and an emergency check-up will be carried out.

The cam positions for conditions Nos. 6, 9, 10 and 11 provide parallel circuits similar to those of condition No. 5 and double signals will be effected upon operation of the transmitter.

Taking the positions of the cams for condition No. 7 the circuit from wire 202 includes contacts 80, 81, wire 203 to the contacts 92, 261, 271, 282 and 292, each of which ends in a broken circuit. Thus no circuit will have been completed to either of the sounding devices and no signal will therefore result. The failure of an audible routine signal, however, is regarded as an alarm, because when a routine signal is not sounded at the planned intervals such constitutes a warning that something has happened to the watchman.

When the dummy preliminary station $B_1$ has been unwittingly actuated by a person not acquainted with the setting of the selector switch SS an alarm signal is certain to be transmitted. For the positions indicated by condition No. 13, the circuit includes wire 202, contacts 80, 81, wire 203, contacts 271, 270 and wire 206 to contact 176 of the switch SS. From here on there are two parallel circuits. One of the circuits is through contact 175 through the wire 209 to the routine signalling device RS. The other circuit is through contact 177, wire 207, contacts 265, 264 and wire 204 to the alarm signalling device AS. Thus a double signal will be sounded warning the attendant at the central office that an intruder is meddling with the system.

Similar signalling results, as set forth in the table, will take place when station $B_2$ is selected as the dummy station. This is accomplished by shifting the switch SS to connect contacts 175, 178 and 179.

It will also be understood that the circuit connections are such that when two or more of the stations vary in cam position from the proper positioning of the cams of the other stations, a warning signal, either alarm, double or silence will result.

It will also be observed that the preliminary stations $A_1$, $A_2$ and $A_3$ have identical connections in the control circuit. This makes for flexibility in the number of premliminary stations which can be provided for a system and for any desired location thereof with respect to the stations $B_1$ and $B_2$. Any number of "A" stations can be connected to a system by merely connecting them to the wires 203, 204 and 210, as is indicated by the connections of the stations $A_1$, $A_2$ and $A_3$.

In addition to the above arrangement and selection of dummy alarm stations, the watchman will be required, when the system is provided with the automatic combination lock as hereinbefore stated, to actuate the stations in a predetermined sequence. In Fig. 1, for example, the sequence of operation is from station T to station $A_1$, passing up the dummy preliminary station $B_1$ and going on to station $B_2$, thence to $A_2$, then $A_3$, and finally back to the transmitter station T which when actuated will send in a routine signal. This sequence of operation is required by the automatic lock which as previously described changes the key combination of the lock each time the lock is actuated. Starting with an initial key, the watchman will first actuate the lock of station $A_1$ and when the lock is returned to normal position and the key removed, the watchman will drop the key in the slot 93 (Figs. 7 and 8) and take the key dropped by actuation of the lock to releasable position in the lower end of the key compartment 94. With this key the watchman will continue to station $B_2$, having passed the now dummy station $B_1$. The key compartments of stations $B_1$ and $B_2$, however, are supplied with master keys which may be used to actuate any one of the combination settings of the locks of the other stations. The master keys are so constructed as to merely actuate the lock without advancing the combination sleeve 114. Therefore, the use of a master key in rotation with the other keys of the system does not interfere with the lock combination feature of the invention. The watchman, however, goes through the same operation at station $B_2$ and again at stations $A_2$ and $A_3$ each time using the key received from the key compartment for operation of the lock of the next succeeding station. When the switch SS is thrown over to change from $B_1$ to $B_2$ as the dummy station it will be necessary to actuate the locks of stations $B_1$ and $B_2$ so as to exchange the keys thereof. The indicators 45 of the two stations will indicate whether or not the two stations are properly set for routine operation, and if one or the other is not it may be actuated again. The watchman may now proceed with the routine operation of the stations by including the station $B_1$ as one of the series of stations to be actuated and avoiding the station $B_2$.

The lock of the transmitter station may likewise be an automatic lock or it may be a dummy type of lock actuatable by any of the keys in a system as herein explained.

Should anyone not acquainted with the setting of the switch SS attempt to transmit routine signals he will not know which station is the dummy station which must be avoided, even if he is aware of its existence. Thus, an intruder will most likely actuate the dummy station $B_1$ which will release a key the same as at any of the other preliminary stations except that it will be a master key. The intruder without suspecting anything wrong will then take the master key and go on to the next succeeding station and so on to the transmitter station T. When, however, he actuates the transmitter station, instead of transmitting a routine signal he will effect an alarm signal. The intruder will be unaware that he has caused an alarm instead of the routine signal.

Referring to Figs. 17 to 20 (also Figs. 15 and 16), an alternative form of lock 300 is illustrated which may be substituted for the automatic combination lock 22. The lock 300 is also a combination type of lock and is in many details the same as the lock 22 of Figs. 12 to 16. The chief differences are in the construction of the key-way shaft 302 and the number of tumbler pins. The other parts which are present in the automatic lock 22 have been for expediency identified by corresponding reference characters.

The key-way shaft 302 is provided with a row of sockets 304 with cut-away parts 306 and 308 intersecting all of the sockets except one at 310. The cut-away portions 306 and 308 are on the same side of the row of sockets so that the combination changing key 312 can only be revolved in one direction, that is counterclockwise as viewed in Fig. 17. When the key 312 is inserted in the lock (Fig. 17) it is adapted to raise the pins 314 thereof so as to release the key-way shaft from the pins 315 and 316. The fifth pin 314 at 310 extends downwardly into the key-way shaft and is engaged by a notch 318 in the combination changing key 312 so that only a key of this character can be used to change the combination of the lock. It will be understood that the location of the part 310 and the notch 318 can be varied for different sets of locks.

Figure 19:
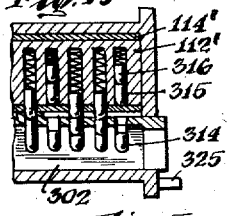
Fig. 19 is a view of the right-hand half of the lock shown in Fig. 17 with the key removed.
Figure 20:
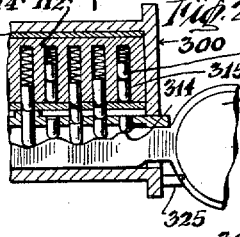
Fig. 20 is the same view as Fig. 19 with a key shown in the lock.
Figure 17:
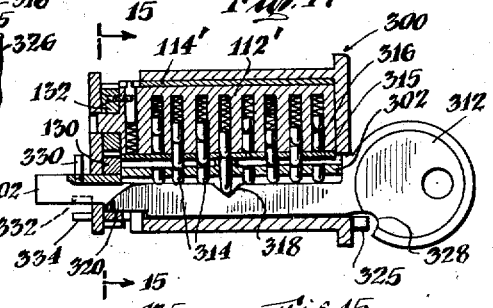
Fig. 17 is a vertical sectional view of another form of combination lock which may be used with a group of watchman's stations.
Figure 18:
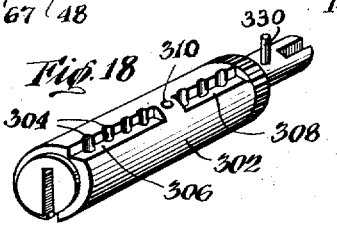
Fig. 18 is a perspective view of the key-way shaft used in the lock shown in Fig. 17.

Fig. 19 illustrates the relative positioning of the tumbler pins 314, 315 and 316 when no key is in the lock. The key-way shaft is effectively held against rotation by the pins 316, such as the three shown extending through the sleeve 114'. Fig. 20 shows the presence of one of the selectable keys in the lock with the tumbler pins so disposed as to provide a break at each of the apertures in the combination row for which the sleeve 114' is positioned. In Fig. 17, the second, third, sixth and seventh tumbler pins 315 are shown extending through the sleeve 114' into the cut-away areas 306 and 308. While these pins will prevent clockwise movement of the combination changing key 312 (Fig. 17), they do not prevent counterclockwise movement thereof because of the cut-away portions 306 and 308 function to raise the pins 315 inwardly of the sleeve 114' prior to movement of the sleeve from one tumbler combination position to another.

Each of the locks 300 is provided with a lug 325 (Figs. 17, 19 and 20) which is adapted to engage the head of the key 326 to render the key movable in the direction (clockwise) opposite to the movement (counterclockwise) of the combination changing key 312 when the key is inserted in the lock. The key 312 is provided with a notch 328 so that the lug 325 cannot interfere with its movement. The clockwise and counterclockwise movements of the keys 312 and 326 can, of course, be interchanged, if desired, by relocating the lug 325 and by having the cut-away portions 306 and 308 on the side of the shaft opposite from their location shown in Fig. 18.

To limit the movement of the shaft 302 in its clockwise or counterclockwise movements, as the case may be, I provide the shaft with a pin 330 which is adapted to engage the stationary stop lugs 332 and 334. The location of the stop 334 will depend upon the circumferential spacing between the rows 116' of apertures in the sleeve 114'.

The inner end 320 of the key 312 is adapted to extend through the opening 144 in the gear 130 to actuate the gear so as to drive the gear 132 and thereby the magazine 112' and the sleeve 114', as hereinbefore described, whereby the sleeve 114' is advanced to a new key combination position. The watchman will use but one key for all stations when the system is provided with this type of lock, it being understood, of course, that all the locks will be set alike, and should the key become lost or stolen, the superintendent or other authorized person may, by using the combination changing key 312 actuate each of the locks and issue a new key to the watchman. Thus, by using this type of lock there will be no need of replacing the several locks when a key becomes missing or the authorities become suspicious that some unauthorized person has obtained a duplicate key. Since this type of lock does not use the rotation idea of keys, any number of stations can be used and the key compartments can be omitted.

While but one form of circuit, transmitter station and preliminary station and but two alternative forms of locks therefor have been disclosed, it is to be understood that various changes in the details of the structure of the several parts and also changes in the circuit connections and switches as well as the arrangement of the several parts may be made without departing from the invention, which is not to be regarded as limited otherwise than as indicated by the language of the appended claims.

I claim:

1. A watchman's signal system comprising a transmitter station and at least one preliminary station, the transmitter and preliminary stations each having a lock, a switch having two contact positions and means operable upon actuation of the lock of each station to change the switch thereof from one to the other of said positions, a signal device, and circuit means connecting said device to the switch of each station, said circuit means being controlled by the relative positioning of said switches to establish one or another of two circuit conditions at said signal device, one circuit condition to effect an alarm when the lock of the transmitter station is actuated and the other to effect a routine signal when the lock of the transmitter station is actuated.

2. A watchman's signal system comprising a transmitter station and a plurality of preliminary stations, said transmitter and said preliminary stations each having a lock, a switch having two contact positions and means operable upon actuation of the lock of each station to change the switch thereof from one to the other of said positions, a signal device, circuit means connecting said device to the switch of each station, said circuit means being controlled by the relative positioning of the station switches to provide any one of a plurality of circuit conditions, one circuit condition being formed by a predetermined positioning of said switches and other circuit conditions being formed should any of said switches fail to be in said predetermined positioning, said one circuit condition operating to effect a routine signal upon actuation of the lock of the transmitter station and said other circuit conditions operating to effect an alarm when the lock of said transmitter station is actuated, and means for connecting one of said preliminary stations as a dummy station which, should it be actuated along with the other stations, will provide a circuit condition which will operate to effect an alarm upon actuation of the lock of the transmitter station regardless of the positioning of the switches of the other stations.

3. A watchman's signal system comprising a transmitter station and a plurality of preliminary stations, said transmitter and said preliminary stations each having a lock, a switch having two contact positions and means operable upon actuation of the lock of each station to change the switch thereof from one to the other of said positions, a signal device, circuit means connecting said device to the switch of each station, said circuit means being controlled by the relative positioning of the switches of the transmitter station and at least one of the preliminary stations to provide one or another of two circuit conditions, one circuit condition to effect an alarm when the lock of the transmitter station is actuated and the other to effect a routine signal when the lock of the transmitter station is actuated, another preliminary station having a two-position switch connected therewith, and means connecting in circuit the switch of such other preliminary station so as to establish it as a dummy station which should it be actuated will establish a circuit condition such that upon subsequent operation of the lock of the transmitter station an alarm will be effected regardless of the positioning of switches of the transmitter station and said first-mentioned preliminary stations.

4. A watchman's signal system comprising a transmitter station and at least two preliminary stations, said transmitter and preliminary stations each having a lock, a switch having a plurality of contact positions and means operable upon actuation of the lock to change the switch from one to the other of said positions, a signal device, circuit means connecting said device to the switches of said stations, at least a given one of the preliminary stations having routine signalling contacts and separate alarm contacts, and means for selectively connecting in circuit either the routine contacts or the alarm contacts of said given station.

5. A watchman's signal system comprising a transmitter station and at least two preliminary stations, said transmitter and preliminary stations each having a lock, a switch having a plurality of contact positions, and means operable upon actuation of the lock to change the switch from one to the other of said positions, said two preliminary stations each having routine signalling contacts and also alarm contacts, a signal device, and means to selectively connect in circuit with said signal device the routine contacts only of one of the stations and the alarm contacts only of another of said stations.

6. A watchman's signal system comprising a transmitter station and a plurality of preliminary stations, said transmitter and preliminary stations each having a lock, a switch having a plurality of contact positions and means operab'e upon actuation of the lock to change the switch from one to the other of said positions, the locks of at least certain of the preliminary stations being each actuatable by a different key, a signal device, and circuit means so connecting said device in circuit with the switches that when each switch is in a predetermined contact position upon operation of the transmitter a routine signal is transmitted and should any of the switches fail to be in the predetermined contact position upon operation of the transmitter an alarm is effected.

7. A watchman's signal system comprising a transmitter station, a plurality of preliminary stations, said transmitter and preliminary stations each having a lock, a switch and means operable upon actuation of the lock to change the switch from one to another contact position, the locks of at least certain of the stations each being provided with a tumbler combination determining element, said certain stations each having a key compartment, means operable upon actuation of the lock to change the tumbler combination thereof for the next subsequent operation and to release a key from the key compartment suitable for actuation of the lock at the next succeeding station, and a circuit so associated with the switches that when each switch is in a predetermined position upon actuation of the transmitter a routine signal is transmitted and should any of the switches fail to be in the predetermined position upon actuation of the transmitter an alarm is effected.

8. A watchman's signal system comprising a transmitter station, at least one preliminary station, said transmitter and preliminary stations each having a lock, a switch and means operable upon actuation of the lock to change the switch from one to another position, the locks each having a tumbler combination determining element adapted to be set to permit actuation of the lock by a predetermined key, a combination changing key, means actuatable by said combination changing key to move the combination determining element of each lock from one combination position to another to permit actuation of the lock by a different predetermined key, a signal device, and circuit means connecting said device with the switches to provide a routine signal condition when each switch is in a predetermined position upon actuation of the transmitter, and an alarm condition should either of the switches fail to be in the predetermined position upon actuation of the transmitter.

9. A watchman's signal system comprising a transmitter station and at least one preliminary station, said transmitter and preliminary stations each having a lock, a switch having two contact positions and a cam movable from one position to another upon actuation of the lock to change the switch from one to the other of said contact positions, a signal device, and circuit means connecting said device with the switch of each station, said circuit means being controlled by the positions of the switches to establish a routine signalling condition when the switches are in a corresponding position upon operation of the transmitter, and establishing an alarm signaling condition should the switches fail to be in corresponding position upon actuation of the transmitter.

10. A watchman's signal system comprising a transmitter station and at least one preliminary station, said transmitter and preliminary stations each having a lock, a switch having two contact positions and means operable upon operation of the lock to change the switch from one to the other of said contact positions, said transmitter station having code transmitting contacts and driving means therefor, said driving means being movable by actuation of the lock of said transmitter station, circuit means controlled by the contact positions of said switches to establish a routine signalling condition when the switches are in corresponding positions upon actuation of the transmitter lock, and means operable when said driving means is moved by actuation of the transmitter lock to prevent repeated actuation of the lock until a complete signal has been transmitted.

11. A watchman's signal system comprising a transmitter station, a plurality of preliminary stations, said transmitter and preliminary stations each having a lock, a switch and means operable upon actuation of the lock to change the switch from one to another contact position, the locks of at least certain of the stations each being provided with a tumbler combination determining element, means operable upon actuation of the lock to change the tumbler combination thereof for the next subsequent operation, and a circuit so associated with the switches that when each switch is in a predetermined position upon actuation of the transmitter a routine signal is transmitted and should any of the switches fail to be in the predetermined position upon actuation of the transmitter an alarm is effected.

12. A signal transmitting station for a watchman's signalling system comprising a code transmitter for transmitting signals, power means for driving said code transmitter, a lock, means operatively connecting said lock to said power means to energize said power means upon operation of said lock and disconnectible from said power means during transmission of a signal, and means actuated by said power means during transmission of the signal and operatively engaging said connecting means for preventing repeated actuation of said lock while said power means is energized and actuated by said power means to release said connecting means from said engagement upon deenergizing of said power means.

13. A watchman's signalling system comprising a plurality of tour stations each having a switch operable from one to the other of two contact positions, a signal device, and circuit means connecting said device to the switch of each station, said circuit means being controlled by the relative positioning of said switches to establish one or another of two circuits including said signal device, and wherein the inclusion of said signal device in one of said circuits will establish an alarm condition and the inclusion of said signal device in the other of said circuits will effect a routine signal.

14. A watchman's signalling system comprising a routine signal element, an alarm signal element, a transmitter station, at least one preliminary station, an auxiliary station, each of said stations having a switch operable alternately to two contact positions, and circuit means connecting said signal elements to said switches so as to actuate said routine signal element when each of said switches is in either a selected or the alternate of its said two contact positions and to actuate said alarm signal element when either said transmitter station switch or said preliminary station switch is in its said selected position or the alternate thereof at the same time that the other of said two switches is respectively in its alternate or selected position, said auxiliary station switch being connected to said routine signal element and to said transmitter station switch so as to prevent actuation of said routine signal element thereby to produce an alarm condition whenever either said auxiliary station switch or said transmitter station switch is in its selected position at the same time that the other is in its alternate position.

15. A watchman's system according to claim 14 which comprises a fourth signalling station having a switch operable alternately to two positions as are said three switches, said fourth station switch also having supplemental contacts alternately opened and closed in said operation of said fourth switch to said two positions, said contacts being connected in series with said auxiliary switch and with said alarm signal element so as to actuate said alarm element whenever said fourth switch is operated to a predetermined one of its two positions.

16. A signal transmitting station for a watchman's signalling system comprising a code transmitter and a power drive therefor, a lock having a rotatable shaft, means responsive to rotation of the shaft and operatively connectible to said power drive to move said power drive to transmitter driving position and disconnectible from said power drive during transmission of a signal, and means operatively connected to said power drive and effective to engage said means responsive to rotation of said shaft when said drive is in driving operation to prevent repeated rotation of said shaft in the operation of said lock until a signal has been transmitted.

17. A signal transmitting station for a watchman's signalling system comprising a code transmitter and a power drive therefor, a lock having a rotatable shaft, means responsive to rotation of said shaft and operatively connectible to said power drive to move said power drive to transmitter driving position, a locking element operatively connected to said means responsive to rotation of the shaft to be movable concomitantly therewith, means actuated by said power drive during operation thereof to transmit the signal effective upon a predetermined return rotation of said shaft toward its initial position in the operation of the lock to engage said locking element to lock said means responsive to the rotation of the shaft against repeated movement thereof by operation of the shaft during transmission of the signal and effective to release said locking element after transmission of the signal.

18. A signal transmitting station for a watchman's signalling system comprising a code transmitter for transmitting signals, power means for driving said code transmitter, a lock having a rotatable member rotated upon operation of the lock, means operatively connected to said rotatable member for movement concomitantly therewith in the operation of the lock and connectible to said power driving means to energize said power driving means upon rotation of said rotatable member in the operation of the lock and disconnectible from said power driving means during operation of said power driving means to transmit the signal, a locking element operatively connected to said rotatable member of said lock for movement concomitantly therewith, means actuated by said power driving means during transmission of a signal to engage said locking element to prevent reoperation of the lock by rotation of said rotatable member, and means actuated by said power driving means and effective upon a predetermined operation of said power driving means in transmitting the signal for disengaging said locking element engaging means from said locking element to release said rotatable member for reoperation of the lock.

19. A signal transmitting station for a watchman's signalling system comprising a code transmitter having driving means operable to a signal initiating position and thereupon effective to operate the transmitter to transmit a given signal, manually operable means, means operatively connected to said manually operable means and connectible to said driving means upon operation of said manually operable means for operating said driving means to said signal initiating position and disconnectible from said driving means during transmission of the signal, and means effective upon such disconnection for locking said means operatively connected to said manually operable means against reactuation thereof during transmission of the signal.

20. A signal transmitting station for a watchman's signalling system comprising a code transmitter having driving means operable to a signal initiating position and thereupon effective to operate the transmitter to transmit a given signal, manually operable means, means operatively connected to said manually operable means and connectible to said driving means upon operation of said manually operable means for operating said driving means to said signal initiating position and disconnectible from said driving means during transmission of the signal, means effective upon such disconnection for locking said means operatively connected to said manually operable means against reactuation thereof during transmission of the signal, and means actuated by said driving means upon a predetermined operation thereof to transmit the signal for actuating said locking means to release said manually operable means for reactuation thereof.

21. A signal transmitting station as defined in claim 19 which comprises switch contacts actuated by said code transmitter adapted to be connected in a circuit to transmit the signal.

22. A signal transmitting station as defined in claim 19 which comprises a switch having two contact positions, and means operatively connected to said switch and to said manually operable means and effective upon operation of said manually operable means to change said switch from one contact position to the other.

23. A watchman's signalling system comprising a transmitter station, a plurality of preliminary stations, said transmitter and preliminary stations each having a switch operable from one to another of two contact positions, means respectively associated with said stations and operatively connected to and operable to change the respective switches from one contact position to another, a signal device operable to produce a routine signal and an alarm signal, and a circuit so connecting said signal device with said switches that when each preliminary station switch is in a selected contact position upon operation of the transmitter station to change its switch to said selected contact position from the other contact position a routine signal is transmitted to said signal device and should any of the switches fail to be in the selected position upon such operation of the transmitter an alarm signal is transmitted to said signal device.

EDWARD A. SCHACHINGER.

REFERENCES CITED

The following references are of record in the file of this patent:

UNITED STATES PATENTS

| Number | Name | Date |
|---|---|---|
| 235,569 | Pond | Dec. 14, 1880 |
| 705,805 | Winter | July 29, 1902 |
| 927,377 | Nolen | July 6, 1909 |
| 998,299 | Nolen | July 18, 1911 |
| 1,160,188 | Miller | Nov. 16, 1915 |

FOREIGN PATENTS

| Number | Country | Date |
|---|---|---|
| 658,026 | German | Mar. 19, 1938 |